REDUCTION OF REDUNDANCY AND BANDWIDTH

Filed April 24, 1956 5 Sheets-Sheet 1

INVENTORS H. P. KRAMER
M. V. MATHEWS
BY Harry C. Hart
ATTORNEY

REDUCTION OF REDUNDANCY AND BANDWIDTH

Filed April 24, 1956 5 Sheets-Sheet 2

INVENTORS H. P. KRAMER
M. V. MATHEWS
BY Harry C. Hart
ATTORNEY

REDUCTION OF REDUNDANCY AND BANDWIDTH

Filed April 24, 1956 5 Sheets-Sheet 3

INVENTORS H. P. KRAMER
M. V. MATHEWS
BY Harry C. Hart
ATTORNEY

INVENTORS H. P. KRAMER
M. V. MATHEWS
BY Harry C. Hart
ATTORNEY

Nov. 3, 1959 H. P. KRAMER ET AL 2,911,476

REDUCTION OF REDUNDANCY AND BANDWIDTH

Filed April 24, 1956 5 Sheets-Sheet 5

INVENTORS H. P. KRAMER
M. V. MATHEWS
BY Harry C. Hart
ATTORNEY

United States Patent Office 2,911,476

Patented Nov. 3, 1959

2,911,476

REDUCTION OF REDUNDANCY AND BANDWIDTH

Henry P. Kramer, Summit, and Max V. Mathews, Madison, N.J., assignors to Bell Telephone Laboratories, Incorporated, New York, N.Y., a corporation of New York Application April 24, 1956, Serial No. 580,310

6 Claims. (Cl. 179—15.55)

This invention relates in general to the modification of signals to facilitate their transmission, and particularly to the compression of the frequency band occupied by such signals. Its principal specific object is to compress the band of frequencies occupied by a telephone message. A more general object is to apply new principles to the band compression or other modification of communication signals. By way of illustration of the invention, which is of general application, it is described herein as applied to frequency band compression.

One well-known approach to the band compression problem, exemplified by Dudley Patent 2,151,091, March 21, 1939, is to divide the entire frequency band occupied by a complex message wave e.g., a speech wave, into a number of constituent subbands, to determine the energy in each such subband and to derive, for each subband, a control signal whose magnitude represents the subband energy. The analysis is performed with a bank of filters to all of which the speech wave is applied in parallel, while a rectifier connected to the output terminal of each filter delivers a signal representative of the energy passing through the filter. The resulting low frequency control signals, after transmission to a receiver station, control the operations of an artificial speech synthesizer.

We have discovered by extended tests that when the voice sounds of ordinary English speech are applied to the Dudley vocoder the resulting output channel vocoder signals are characterized by considerable redundancy in that the energy contents of some channels are closely covariant with the energy contents of other channels; in other words, the signals in these channels are closely correlated. When such a situation exists it follows from information theory that frequency space is being wasted; that is to say, a greater amount of information could, in principle, be carried over the same channels or, better still, since the quality of ordinary vocoder speech is adequate, the same or nearly the same information could be carried over a smaller number of channels. This prompts the question, whether the channel control signals could somehow be converted or reorganized in such a way as to produce these advantageous results.

The present invention is based on the realization that by converting a first set of signals, e.g., the channel control signals of the Dudley patent, which are ordered on the frequency scale, into a different set of signals, derived from the first set and therefore carrying the same information but ordered, instead, on a scale of energy content or significance, it becomes possible to dispense entirely with those channels which lie at the bottom of the scale of importance without seriously degrading the final reconstructed speech.

It is known that through the agency of a crossnet of conductors, e.g., a set of horizontal and a set of vertical conductors, the conductors of one set serving as input conductors and the conductors of the other set serving as output conductors, with a transfer element or multiplier at each crosspoint of the net, each of the output signals depends on all of the input signals in various proportions so that the output signals, entirely different in character from the input signals, together carry the same total information.

The invention is based on three further discoveries:

First, that with appropriate selection of the magnitudes of the transfer elements at the crosspoints of the net, the output signals may be ordered in importance; more specifically, they may be arranged in an order such that the degradation introduced by omission of any low order signal channel is minimized. That is to say, the information content of each such signal is greater than that of the next lower numbered signal. Stated in another way, each such signal is, by itself, more nearly representative of the original message wave than is the next lower numbered signal by itself.

Second, that for such ordering in the optimum fashion the transfer elements should be proportioned in accordance with a particular recipe, and that when this recipe is followed, the means squared error, entailed by omission of a lower order channel as compared with a higher order channel is minimized; and Third, that for this optimum ordering the recipe is that the various transfer elements of the crossnet should be proportional, respectively, to the various components of the various normalized characteristic vectors or "eigenvectors" of a matrix M, of which the elements are the averaged products of all the input signals, these various normalized eigenvectors being those which correspond, respectively, to the various eigenvalues of the matrix M, numbered in order of decreasing magnitude.

In this connection by "normalized eigenvector" it is meant that the sum of the squares of the several components of each such eigenvector is equal to unity. Henceforward, each time an eigenvector is referred to it is to be understood as a normalized eigenvector.

Thus, with a crossnet of $n$ input conductors and $n$ output conductors there are $n^2$ crosspoints and therefore $n^2$ transfer elements. In particular, the averaged products of all the input signals, taken two by two, are $n^2$ in number, and this matrix is denoted "M." These may be treated as a square symmetric matrix of order $n$. Such a matrix has $n^2$ elements and it has $n$ eigenvalues of, in general, $n$ different magnitudes. To each of these eigenvalues there corresponds one eigenvector which has $n$ components. Hence, all the components of all the eigenvectors are $n^2$ in number and these, arranged in order of decreasing magnitudes of the eigenvalues to which they correspond, may be regarded as the elements of a second matrix N which is derived from the first matrix M in a definite and straightforward fashion. It then remains merely to choose or adjust the transfer elements of the crossnet in such a way that they are respectively proportional to the elements of the second matrix N.

With this arrangement it turns out that some of the output signals are of highest importance and others are of lowest importance, their importance decreasing monotonically from the first to the last. It appears, further, that the last channel and, indeed, the last several channels, are of such low importance that they can be completely dispensed with or discarded without serious loss of information, and therefore without excessive degradation of the reconstructed speech.

The more important of the output signals are now transmitted to a receiver station where they are applied to the input conductors of a second crossnet. In this second crossnet each of the transfer elements is again proportional to a corresponding element of a matrix $N_T$ or $N^{-1}$ which is the transpose or inverse of the matrix N. This second matrix acts to reconvert the transmitted signals into the original input signals, ordered on the frequency scale, with no change except that due to the loss of the information contained in those least important transmission signals which were eliminated. The resulting frequency scale control signals may now be applied to the corresponding input points of voice synthesizer apparatus such as that described in the Dudley patent, and they operate in Dudley's fashion to control the synthesis of artificial speech.

The invention will be fully apprehended from the following detailed description of an illustrative embodiment thereof in the field of voice signal band compression, taken in connection with the appended drawings in which.

Figure 4A:
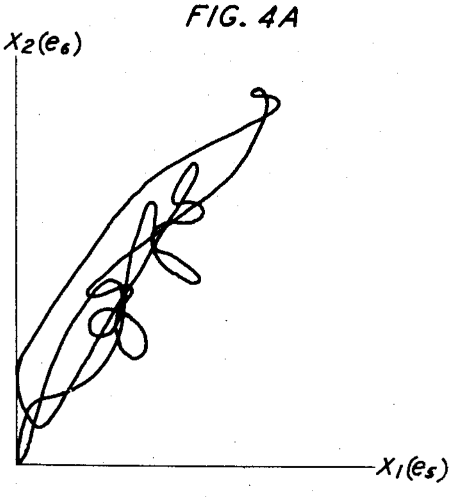
Figure 4C:
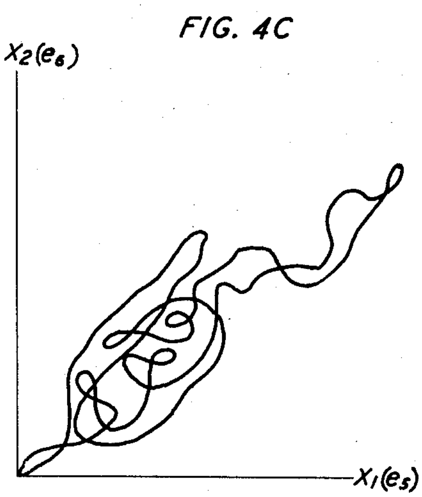
Figure 4B:
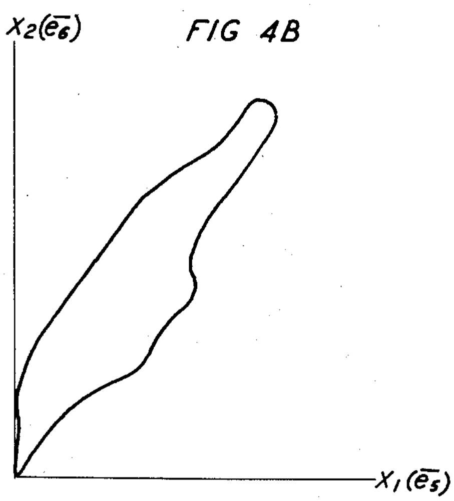
Figure 5:
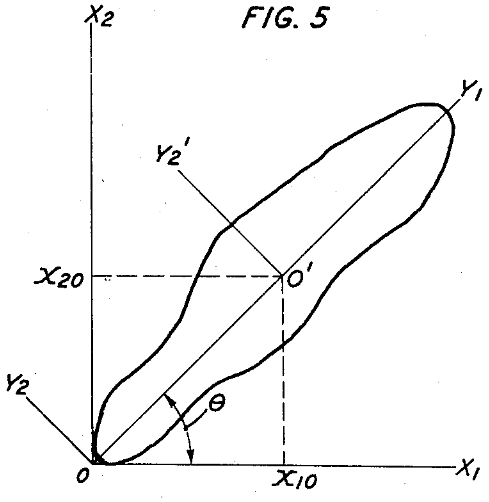
Figure 6:
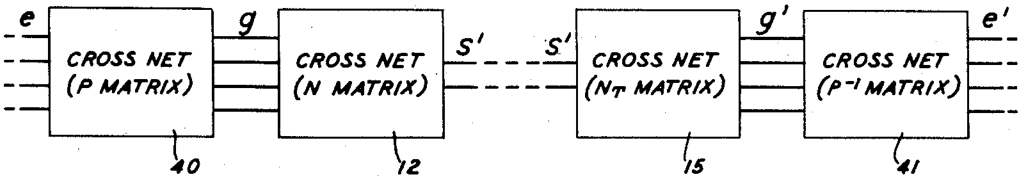

Figs. 4*a*–4*c*, 5 and 7 are diagrams of assistance in explaining the operation of the invention; and Fig. 6 is a block schematic diagram illustrating the invention in a more general form.

*The apparatus*

Figure 1:
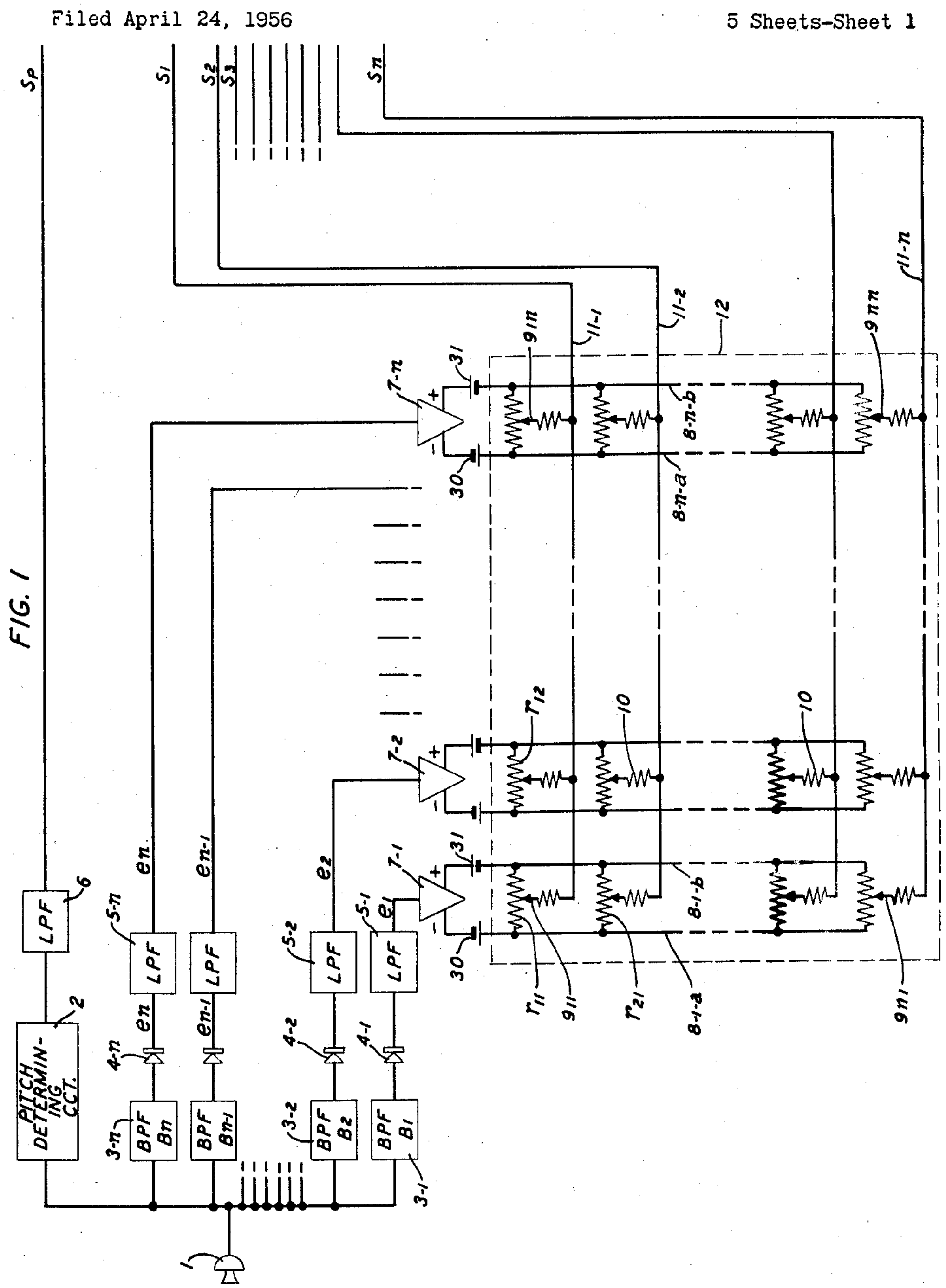
Fig. 1 shows a transmitter apparatus in accordance with the invention.

Referring now to Fig. 1, a signal, for example a voice signal originating in a microphone 1, is applied to a pitch determining device 2 and, in parallel, to a bank of bandpass filters 3—1 to **3—*n*. Each of these filters is proportioned to pass a preassigned subband, $B_1$, $B_2 \ldots B_n$ of the component frequencies of the voice signal. To the output terminals of these several filters rectifiers 4 are connected, and each rectifier is followed by a low-pass filter 5. The output terminals of these filters then carry channel control signals $e_1$, $e_2 \ldots e_n$, of very low frequencies, each representative of the energy in one of the frequency subbands. The pitch determining device 2 is likewise followed by a low-pass filter 6**, and the output of this filter is another low frequency signal $S_p$ which is representative of the pitch of the voice signal. All of these elements may be conventional and as fully described in the aforementioned Dudley patent.

Figure 2:
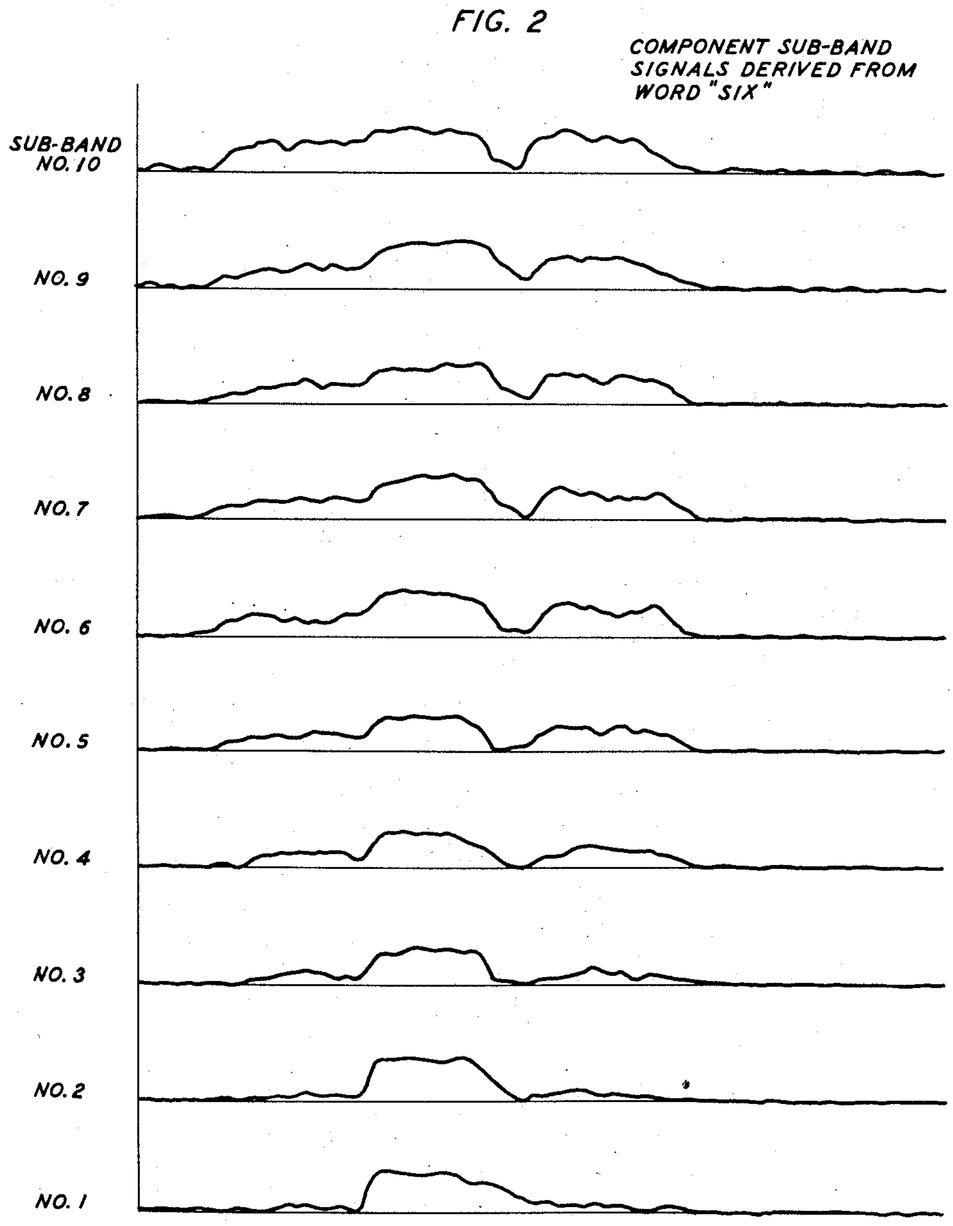
Fig. 2 is a group of waveform diagrams illustrating the substantial amounts of correlation which hold between the channel control signals of an ordinary vocoder transmission system.

Fig. 2 is a group of waveform diagrams showing the amplitudes of the frequency subband control signals derived by a ten-channel vocoder constructed in this fashion as functions of time when the voice signal applied to the microphone 1 is the word "six" as pronounced in the ordinary American fashion. It is obvious from an examination of Fig. 2 that substantial correlation exists between the energy in each channel and the energy in its neighbors. It has been determined that similar correlations exist among the several channels for all or nearly all the sounds of English speech. The correlation between the energies in adjacent channels is greater still when the channels are located closer together on the frequency scale as, for example, when the full frequency range of the input signals is spanned by sixteen filters instead of by ten.

The present invention takes advantage of the correlation illustrated in Fig. 2 to effect a substantial reduction in the number of channels required. In accordance with the invention the outputs of the several low-pass filters 5, instead of being transmitted directly to a receiver station as in the Dudley patent, are applied to the input points of a like number of phase splitter amplifiers 7. Each of these amplifiers, which may be of well-known construction, is provided with two output points, one of which gives a signal which is a positive counterpart of the input signal while the other carries a signal which is its negative counterpart. To the two output points of each amplifier are connected a vertical pair of input conductors **8–1–*a*, 8–1–*b* . . . 8–*n*–*b*, and a plurality of resistors $r_{11}$, $r_{12}$, and so forth are bridged across each such pair. Each of these resistors is provided with an adjustable tap 9 and all the taps in a single horizontal row are connected by way of individual padding resistors 10 to a single horizontal output conductor 11**. The same construction holds for the resistors *r*, the taps 9, the padding resistors 10 and the horizontal conductors 11 of each of the other horizontal rows. Thus the vertical conductor pairs 8 which extend from the amplifiers 7 and the horizontal conductors 11 to which the taps 9 are connected constitute a crossnet 12, and each of the resistors $r_{ij}$ with its tap constitutes a transfer element. Each resistor is identified by two subscripts of which the first designates the output conductor 11 to which it is connected while the second one designates the input conductor pair 8 to which it is connected. It is shown below that the magnitude of the several transfer elements are arrived at by equating them to the several components of the eigenvectors of a certain matrix. Components of this sort are customarily designated by two subscripts of which one designates the row of the matrix in which it appears and the other the column. In the present specification the usual convention is adopted that the first subscript designates the row and the second subscript designates the column. To preserve the fullest correspondence between the identifications of the transfer elements and the points of the network at which they are located with the corresponding matrix elements, the crossnet of Fig. 1 is shown with its input conductors vertical and its output conductors horizontal. The same convention is adopted for the crossnet of Fig. 3, described below, and for the same reasons.

The location of any tap 9, for example the tap $\mathbf{9}_{11}$ on the uppermost resistor $r_{11}$ of the left-hand vertical conductor pair **8–1–*a*, 8–1–*b*, determines the fraction of the signal on that vertical conductor pair which is delivered to a particular horizontal conductor 11 in this example the uppermost one 11–1. Location of the tap at the right-hand end of the resistor contributes the full positive value of the signal. Location of the tap at any point between the right-hand and the center of the resistor contributes a corresponding fractional part of this input signal. When the tap is located at the midpoint of the resistor the contribution of the left-hand input signal to the uppermost output conductor is zero. When the tap is to the left of the midpoint its contribution is negative. Hence each of the output conductors 11 carries a composite signal $S_1$, $S_2$, and so forth, which is made up of contributions from the several input signals $e_1$, $e_2$, and so forth, in various proportions, positive or negative, as determined by the settings of the taps 9** on the various resistors *r* of the crossnet.

In accordance with the present invention these taps are to be adjusted to embody a particular recipe to be given and justified in detail below. Postponing consideration of this recipe for the present and assuming that it has been embodied in the design of the crossnet 12, the sum total of the output signals $S_1$, $S_2$, and so forth, contain the same information as is contained in the sum total of the input signals $e_1$, $e_2$, and so forth, but completely reorganized in such a fashion that the output signals are arranged in order of their importance or significance, as measured by their energy contents. Hence, those standing at the foot of the importance scale may be dispensed with or eliminated, the remaining ones, commencing with output signal $S_1$, which heads the importance list, being transmitted, along with the pitch control signal $S_p$, to a receiver station.

Figure 3:
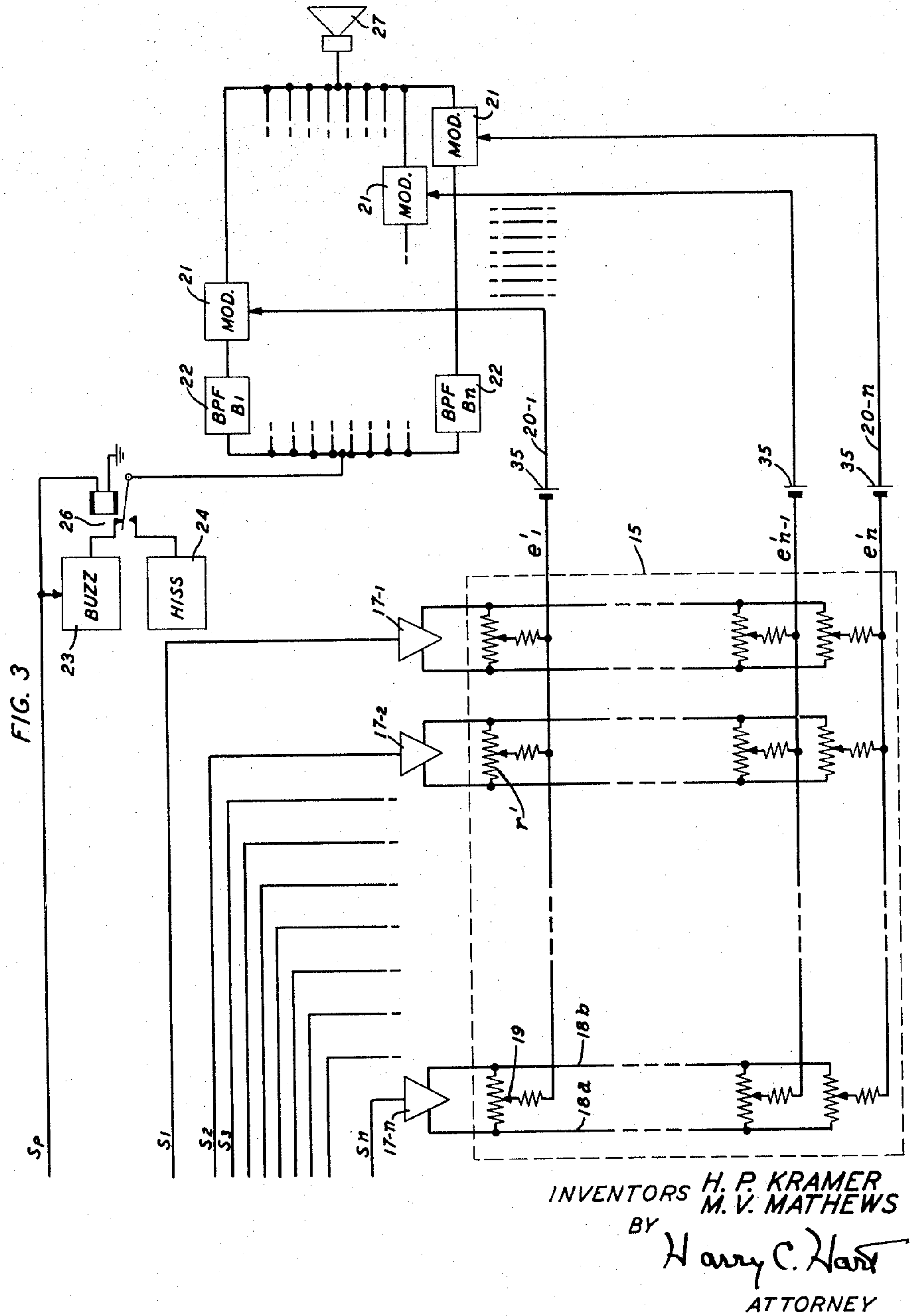
Fig. 3 shows receiver apparatus in accordance with the invention.

At the receiver station, shown in Fig. 3, the incoming composite signals are applied to the input conductors of a crossnet 15 which may have the same configuration as the crossnet of Fig. 1. Its transfer element *r′* however, are unlike those of the crossnet of Fig. 1 but related to them in a particular fashion to be described, such that the crossnet of Fig. 3 operates to reconvert the incoming signals $S_1$, $S_2$, and so forth, into another group of signals $e_1'$, $e_2'$, and so forth, which are again ordered on the frequency scale and are identical with the conventional channel vocoder control signals $e_1$, $e_2$, and so forth, except for a certain degradation entailed by discarding the least significant channels.

These output signals of the second crossnet are applied in the fashion described by Dudley to the control terminals of a group of modulators 21, to whose input terminals the various frequency components of a locally generated wave are applied, the restriction to a particular component or group of components being effected in the customary fashion by bandpass filters 22 in accordance with conventional vocoder techniques. The wave thus applied through the filters 22 to the modulators 21 originates in a buzz source 23 or a hiss source 24 as called for by the character of the pitch control signal $S_p$ which operates through a control terminal 25 to tune the buzz source 23 to the pitch frequency and, through a relay 26, to select as between the buzz source 23 and the hiss source 24 in dependence on the voiced-unvoiced character of the speech. The output terminals of the several modulators 21 are connected together and to a sound reproducer 27 which then delivers artificial synthetic speech.

*Design of the crossnet and justification thereof*

Returning now to Fig. 2, consider the waves of channels 5 and 6. They both start to rise from zero at nearly the same instant. No. 6 rises somewhat faster than No. 5 and goes through small subsidiary oscillations. At a later instant they both rise rapidly together, No. 6 rising slightly higher than No. 5. They then level off, No. 5 remaining substantially horizontal and No. 6 falling slightly. They then both fall nearly to zero at a later instant. Following a brief interval of substantially no amplitude they rise again, No. 5 to a broad wavy peak and No. 6 to two slightly higher peaks separated by a shallow valley. Finally they fall to zero together.

In Fig. 4A the horizontal ($X_1$) axis represents the energy in channel 5 and the vertical ($X_2$) axis represents the energy in channel 6. In this figure successive pairs of values, one from channel 5 of Fig. 2 and one from channel 6, have been plotted against each other for successive instants in the progress of the wave. The resulting wavy curve starts from near zero, returns to near zero, and lies for the most part close to a 45 degree line in the first quadrant. If the fact that the wavy curve makes minor loops, and crosses itself from time to time be disregarded, the envelope of the wavy line has the outline of a bean, or of a long, thin, somewhat lumpy cigar extending from the origin of coordinates substantially at 45 degrees, as shown in Fig. 4B.

If the energies in the same two channels were to be plotted in the same fashion for any other sound of American speech the result would in each case again be a wavy line which starts from near zero, extends outward at approximately 45 degrees and returns to near zero after several minor loops and self crossings. An example is shown in Fig. 4C. The ensemble of all such curves for channels 5 and 6 is shown in Fig. 5. It is evidently a figure of approximately elliptical shape with one extremity passing through the origin and its major axis extending from the origin at approximately 45 degrees. This figure is somewhat thicker at its widest point than the cigar-shaped figure of Fig. 4B, but it is also longer.

In referring analytically to any point of the bean-shaped figure of Fig. 4B or the more distended figure of Fig. 5, it is evident that the horizontal coordinate $X_1$ and the vertical coordinate $X_2$ are of substantially equal importance. Assume, however, that the coordinates of the figure be rotated through such an angle $\theta$ that one of the new axes, $Y_1$, coincides with the major axis of the figure, the other new axis, $Y_2$, being perpendicular to the $Y_1$-axis. It is now evident that in describing the location of any point on the figure the $Y_1$-axis is much more significant than the $Y_2$-axis.

It is well known and regularly established in text-books dealing with analytical geometry that the location of any point in the plane of the axes, e.g., any coordinate of the figure, referred to the new axes $Y_1$, $Y_2$ is given as a function of its location as referred to the old axes, $X_1$, $X_2$, by the following formulae:

$$\begin{aligned} y_1 &= x_1 \cos\theta + x_2 \sin\theta \\ y_2 &= -x_1 \sin\theta + x_2 \cos\theta \end{aligned} \quad (1)$$

If the energies in three channels, for example channels Nos. 5, 6 and 7 were to be plotted in a rectangular coordinate system, for example $e_5$ horizontally, $e_6$ vertically and $e_7$ perpendicular to the plane of the paper, the result would be a three dimensional surface. Referring again to Fig. 2 and noting the high degree of correlation which holds between the energy in channel 7 and the energies in channels 5 and 6, this three dimensional surface would again evidently be an elongated figure having approximately the form of a full-bodied cigar or bean, and extending from the origin at angles of 40–60 degrees from each of the three coordinates. It would then evidently be possible to rotate the axes of the coordinates in such a way that the new $X_1$-axis coincides with the longest axis of the bean-shaped surface, the new $Y_3$-axis coincides with its shortest axis and the new $Y_2$-axis coincides with the axis which is of intermediate length. Evidently, again, in specifying any point of the surface in relation to the new axes, the $Y_1$-axis is by far the most important of the three, the $Y_2$-axis being of less importance and the $Y_3$-axis of least importance. Analytically, the specification of any point of the surface in the new coordinate system depends on its three coordinates $x_1$, $x_2$, $x_3$ of the old frame of reference and on trigonometric functions of the angles between the new axes and the old axes.

Extension of the foregoing transformations to $n$ dimensions from old axes $X_1, X_2 \ldots X_n$ to new axes $Y_1, Y_2 \ldots Y_n$ leads to a set of simultaneous equations as follows:

$$\begin{aligned} y_1 &= c_{11}x_1 + c_{12}x_2 + \ldots + c_{1n}x_n \\ y_2 &= c_{21}x_1 + c_{22}x_2 + \ldots + c_{2n}x_n \\ &\vdots \\ y_n &= c_{n1}x_1 + c_{n2}x_2 + \ldots c_{nn}x_n \end{aligned} \quad (2)$$

In the simplest case of two dimensions, Equations 2 reduce to $$\begin{aligned} y_1 &= c_{11}x_1 + c_{12}x_2 \\ y_2 &= c_{21}x_1 + c_{22}x_2 \end{aligned} \quad (3)$$

It is evident from a term for term comparison of Equations 3 with Equations 1 that the following correspondences exist:

$$\begin{aligned} c_{11} &= \cos\theta \\ c_{12} &= \sin\theta \\ c_{21} &= -\text{sine}\,\theta \\ c_{22} &= \cos\theta \end{aligned} \quad (4)$$

Returning to Fig. 1, the several output conductors 11 carry signals $S_1$, $S_2$, and so forth, each of which is a sum of individual contributions from the various input signals $e_1$, $e_2$, and so forth, in amounts determined by the settings of the taps 9 on the various resistors $r$. Thus, if the tap settings be represented by factors $k_{11}$, $k^{12}$, and so forth, the relation between input signals and output signals is given by $$\begin{aligned} S_1 &= k_{11}e_1 + k_{12}e_2 \ldots + k_{1n}e_n \\ S_2 &= k_{21}e_1 + k_{22}e_2 \ldots + k_{2n}e_n \\ &\vdots \\ S_n &= k_{n1}e_1 + k_{n2}e_2 \ldots + k_{nn}e_n \end{aligned} \quad (5)$$

in which, as with the resistors $r$, the first subscript of a typical $k_{ij}$ indicates the output conductor of the crossnet and the second one indicates the input conductor. Equations 5 reduce, for the case of two input signals and two output signals, to $$S_1=k_{11}e_1+k_{12}e_2 \quad S_2=k_{21}e_1+k_{22}e_2 \tag{6}$$

Comparison of (6) with (3) and (5) with (2) shows that they are formally the same. Hence the operation of the crossnet 12 of Fig. 1 is to carry out a conversion of the input signals $e_1$, $e_2$, and so forth, into output signals $S_1$, $S_2$, and so forth, which is the electrical counterpart of the transformation of coordinates represented by Equations 1, 2 or 3.

In particular, in the two dimensional case, the crossnet 12 of Fig. 1 carries out a conversion of input signals $e_1$, $e_2$ into output signals $S_1$, $S_2$ which is the exact counterpart of the rotation of coordinates in Fig. 5. Hence, too, if the angle $\theta$ of coordinate rotation in Fig. 5 be such as to bring one of the new axes, e.g., the $Y_1$ axis, into coincidence with the major axis of the bean-shaped figure and the other axis, $Y_2$, into coincidence with its minor axis, the first output signal $S_1$ of the crossnet will be of most significance and the second output signal $S_2$ will be of least significance.

It remains to determine the roation angle $\theta$ which produces the optimum result in the two dimensional case, and to generalize the determination for $n$ dimensions.

In the case of a simple, symmetrical figure such as an ellipse, it can be seen at a glance that the magnitude of the rotation angle $\theta$ which produces this result is such that one of the new coordinate axes coincides with the major axis of the ellipse and the other with its minor axis. Vectors which extend in the direction of these ellipse axes are known, in the terminology of matrix algebra, as the "eigenvectors" of the ellipse. Other figures, e.g., the bean-shaped figure of Fig. 5 also have eigenvectors, though these can no longer be precisely identified with any major and minor axes.

It is shown below that when the coordinate axes are rotated through angles $\theta$ such that the mean squared error entailed by disregarding the lesser one is minimized, the new coordinate axes coincide with the eigenvectors of the figure.

Consider again Equations 1:

$$y_1=x_1\cos\theta+x_2\sin\theta \quad y_2=-x_1\sin\theta+x_2\cos\theta \tag{1}$$

The inverse equations are $$x_1=y_1\cos\theta-y_2\sin\theta \quad x_2=y_1\sin\theta+y_2\cos\theta \tag{7}$$

If a point of the bean-shaped figure (Fig. 5) were to be defined only in terms of its $Y_1$ coordinate, its $Y_2$ coordinate being disregarded, thus $$x_1'=y_1\cos\theta \quad x_2'=y_1\sin\theta \tag{8}$$

the resulting errors in the location of the point would be, for one coordinate, $x_1-x_1'$ and for the other coordinate $x_2-x_2'$. The square of the total error would then be, since the errors are mutually independent, $$E=e_T2=(x_1-x_1')^2+(x_2-x_2')^2 \tag{9}$$

$$=y_2^2(\sin^2\theta+\cos^2\theta)=y_2^2 \tag{10}$$

Substitution of Equation 1 into 10 gives $$E=x_1^2\sin^2\theta-2x_1x_2\sin\theta\cos\theta+x_2^2\cos^2\theta \tag{11}$$

If the error of interest be an average of any sort, e.g., an average in the time domain, weighted or unweighted, resulting from correspondingly averaged variations with time of the coordinates $x_1$ and $x_2$, (11) can be rewritten for such average values as $$\overline{E}=\overline{x_1^2}\sin^2\theta-\overline{2x_1x_2}\sin\theta\cos\theta+\overline{x_2^2}\cos^2\theta \tag{12}$$

With the introduction of the definitions $$h_1=-\sin\theta \quad h_2=\cos\theta \tag{13}$$

(12) becomes $$\overline{E}=h_1^2\overline{x_1^2}+2h_1h_2\overline{x_1x_2}+h_2^2\overline{x_2^2} \tag{14}$$

Next, following Lagrange's method of undetermined multipliers, introduce the function $$F=E-L(h_1^2+h_2^2) \tag{15}$$

From (13), $$h_1^2+h_2^2=1 \tag{16}$$

wherefore $$L(h_1^2+h_2^2)=L \tag{17}$$

and hence, if L be a constant, F differs from E only by a constant. To determine extremal values of F, and hence of E, take the partial derivatives of (15) with respect to $h_1$ and $h_2$ and set them equal to zero:

$$\frac{\delta F}{\delta h_1}=2h_1\overline{x_1^2}+2h_2\overline{x_1x_2}-2Lh_1=0 \quad \frac{\delta F}{\delta h_2}=2h_1\overline{x_1x_2}+2h_2\overline{x_2^2}-2Lh_2=0 \tag{18}$$

or $$(\overline{x_1^2}-L)h_1+\overline{x_1x_2}h_2=0 \quad \overline{x_1x_2}h_1+(\overline{x_2^2}-L)h_2=0 \tag{19}$$

Values of $h_1$ and $h_2$ which satisfy Equations 19 are found, in well-known fashion, by setting the determinant of the coefficients in Equations 19 equal to zero and solving for L: Thus $$\begin{vmatrix}(\overline{x_1^2}-L) & \overline{x_1x_2}\\ \overline{x_1x_2} & (\overline{x_2^2}-L)\end{vmatrix}=0 \tag{20}$$

Equation 20 is a quadratic in L and hence has two solutions, namely $$L=L_1 \quad L=L_2 \tag{21}$$

Of these, $L_1$ may be designated the larger value and $L_2$ the smaller value. Values of $h_1$ and $h_2$ can be determined corresponding to each of these values of L.

Equations 18 or 19 are the conditions that the error $\overline{E}$ of Equation 14 shall have an extremal value. Any such extremal value can be found by substituting into Equation 14 those values of L, $h_1$ and $h_2$ which satisfy Equations 18 or 19. This substitution is most easily carried out by multiplying the first of Equations 19 by $h_1$ and the second by $h_2$ and adding the resulting equations to give $$(\overline{x_1^2}-L)h_1^2+2\overline{x_1x_2}h_1h_2+(\overline{x_2^2}-L)h_2^2=0 \tag{22}$$

or $$L(h_1^2-h_2^2)=\overline{x_1^2}h_1^2+2\overline{x_1x_2}h_1h_2+\overline{x_2^2}h_2^2 \tag{23}$$

Because the right-hand side of Equation 23 is identical with the right-hand side of Equation 14 the left-hand sides of these equations must also be equal. That is to say $$\overline{E}=L(h_1^2+h_2^2) \tag{24}$$

or, in view of Equation 16

$$\overline{E}=L \tag{25}$$

Hence, referring again to Equation 21, there are two such extremal values of $\overline{E}$, namely $$\overline{E}_1=L_1 \quad \overline{E}_2=L_2 \tag{26}$$

If, therefore, the larger value of L and the corresponding values of $h_1$ and $h_2$ are employed the resulting extremal value of $\overline{E}$ is a maximum and, to the contrary, if the smaller value $L_2$ and the corresponding values of $h_1$ and $h_2$ are employed the resulting value of $\overline{E}$ is a minimum.

In terms of eigenvectors this means that the transformation coefficients $c_{21}$ and $c_{22}$ of Equations 3, which relate the less important of the two new coordinates to the old coordinates, are the components of the eigenvector having the smaller eigenvalue. Thus the new coordinates $y_1$, $y_2$ have been arranged in order of decreasing importance. Similarly, in the case of $n$ dimensions the new coordinates $y_1, y_2 \ldots y_n$ are arranged in order of decreasing importance when the eigenvectors whose coefficients determine these new coordinates are arranged in descending order of the magnitudes of their eigenvalues.

Next, consider all the average products of the $n$ input signals, $e_1$, $e_2$, and so forth, taken two at a time, including the product of each by itself, or its square. These products may readily be formed with the assistance of electronic multipliers to which are applied the input signals $e_1$, $e_2$, and so forth, as represented for the speech sound "SIX" on Fig. 2. These products, arranged in $n$ rows and $n$ columns are:

$$M=\begin{bmatrix} \overline{e_1e_1} & \overline{e_1e_2} \ldots & \overline{e_1e_n} \\ \overline{e_2e_1} & \overline{e_2e_2} \ldots & \overline{e_2e_n} \\ \cdot & \cdot & \cdot \\ \cdot & \cdot & \cdot \\ \cdot & \cdot & \cdot \\ \overline{e_ne_1} & \overline{e_ne_2} & \overline{e_ne_n} \end{bmatrix} \quad (27)$$

For ease of manipulation, assign a symbol $a_{ij}$ to each of these products, giving a matrix of order $n$, having $n^2$ elements, namely $$M=\begin{bmatrix} a_{11} & a_{12} \ldots & a_{1n} \\ a_{21} & a_{22} \ldots & a_{2n} \\ \cdot & \cdot & \cdot \\ \cdot & \cdot & \cdot \\ \cdot & \cdot & \cdot \\ a_{n1} & a_{n2} \ldots & a_{nn} \end{bmatrix} \quad (28)$$

Now it is well established in textbooks dealing with matrix algebra, for example "Methods of Applied Mathematics" by F. B. Hildebrand (Prentice-Hall, 1952) that $$pH=MH \quad (29)$$

where H is any eigenvector of the matrix M and $p$ is the corresponding eigenvalue, and that solutions of Equation 29 exist.

In the simple case in which the matrix M is of the second order, it has two rows, two columns, and two different eigenvectors, each of which has two components $h$. In this case Equation 29 may be written, in expanded form, $$p\begin{bmatrix} h_1 \\ h_2 \end{bmatrix}=\begin{bmatrix} a_{11} & a_{12} \\ a_{12} & a_{22} \end{bmatrix}\begin{bmatrix} h_1 \\ h_2 \end{bmatrix} \quad (30)$$

in which the two matrix elements having unlike subscripts are similarly designated to stress the fact that, in this particular case, their magnitudes are equal. In expanded form Equation 30 can be written $$\begin{aligned} (a_{11}-p)h_1+a_{12}h_2&=0 \\ a_{12}h_1+(a_{22}-p)h_2&=0 \end{aligned} \quad (31)$$

wherein $h_1$, $h_2$ are the components of an eigenvector H, of the matrix $$\begin{bmatrix} a_{11} & a_{12} \\ a_{12} & a_{22} \end{bmatrix} \quad (32)$$

for a given value, $p_1$ or $p_2$, of its eigenvalue $p$.

Compare Equations 31 with Equations 19. They have the same form as they stand. They have the same content provided $$\left.\begin{aligned} a_{11}&=\overline{x_1^2} \\ a_{12}&=\overline{x_1x_2} \\ a_{22}&=\overline{x_2^2} \\ p&=L \end{aligned}\right\} \quad (33)$$

The only restriction on these equalities is that obtained by combining (33) with (27) and (28), which requires that $$\begin{aligned} \overline{x_1^2}&=\overline{e_1^2} \\ \overline{x_1x_2}&=\overline{e_1e_2} \\ \overline{x_2^2}&=\overline{e_2^2} \end{aligned} \quad (34)$$

in other words, that the $x$ coordinates of Fig. 5 shall correspond to the input signals of Fig. 1. With this sole proviso, the correspondence is complete; and from this correspondence it appears that the way in which to choose the rotation angle $\theta$ of Fig. 5 for minimum error due to neglect of the coordinate $x_2$ is to chose it so that its sine and cosine are the components of the eigenvectors of the matrix defining the figure to be described. When the multiplier elements of the crossnet 12 of Fig. 1 have been thus proportioned, the crossnet carries out a signal conversion such as to minimize the mean squared error due to neglect of the less important of the two output signals.

It can be rigorously proved that the foregoing eigenvector relation holds equally well for any number of dimensions. Hence the invention minimizes the mean squared error which results from the omission of any number of output signals, starting at the foot of the importance scale.

Indeed, that this is the case can readily be appreciated without proof, from the following. Equation 29 holds equally for more than two dimensions. When the foregoing two-dimensional analysis is extended to a square symmetric matrix of $n$ rows and $n$ columns, having therefore $n$ eigenvalues $p_i$, generally though not necessarily different in magnitude, it becomes necessary to assign two subscripts to each component of each eigenvector. On this understanding, Equation 30 becomes $$p_i\begin{bmatrix} h_{i1} \\ h_{i2} \\ \cdot \\ \cdot \\ \cdot \\ h_{in} \end{bmatrix}\begin{bmatrix} a_{11} & a_{12} \ldots & a_{1n} \\ a_{21} & a_{22} \ldots & a_{2n} \\ \cdot & \cdot & \cdot \\ \cdot & \cdot & \cdot \\ \cdot & \cdot & \cdot \\ a_{n1} & a_{n2} & a_{nn} \end{bmatrix}\begin{bmatrix} h_{i1} \\ h_{12} \\ \cdot \\ \cdot \\ \cdot \\ h_{in} \end{bmatrix} \quad (30a)$$

This may be expressed in shorthand notation as $$p_ih_{ij}=\sum_{r=1}^{n} a_{jr}h_{ir}$$

Substituting, as in Equation 27, the signal product averages $\overline{e_ie_j}$ for the matrix elements $a_{ij}$ gives $$p_ih_{ij}=\sum_{r=1}^{n} \overline{e_je_r}.h_{ir} \quad (30b)$$

Hence, to obtain the desired operation from the crossnet, the transfer factor $k_{ij}$ of each of its crosspoint elements is to be equated to $h_{ij}$, the magnitude of the $j$th component of the eigenvector corresponding to the $i$th eigenvalue $p_i$ of the matrix M of 27, where, in the case of the eigenvector component, the first subscript indicates the row and the second the column of the matrix while, in the case of the transfer element, the first subscript designates the output conductor of the crossnet and the second the input conductor to which the transfer element is connected, with the restriction that the eigenvalues $p_i$ are numbered in decreasing order of magnitude; i.e., $$p_1 \geq p_2 \geq \ldots \geq p_{n-1} \geq p_n$$

It will now be readily recognized that the sequence of steps to be followed in arriving at the magnitudes of the transfer factors of the various elements of the crossnet are the following:

(*a*) Select a group of representative signals resembling those on which it is required that the crossnet shall operate; for example if, as in the present illustration, the input signals to the crossnet in operation are to be the control signals delivered by a vocoder and hence divided on the frequency scale, the representative signals to be selected should preferably be a like-numbered group of signals, similarly divided on the frequency scale and likewise derived from the speech wave of a talker engaged in average utterances. On the understanding that the signals thus selected are to be of the same type as the input signals employed in operation, they may be similarly designated; vis. $e_1, e_2 \ldots e_j \ldots e_n$;

(*b*) form the product of each such selected representative signal $e_i$ with every other one $e_j$ and with itself, for all values of $i$ and $j$ from 1 to $n$ inclusive;

(*c*) average each such product;

(*d*) dispose the averaged products in a square matrix of $n$ rows and $n$ columns, thus:

$$\left\|\begin{matrix} \overline{e_1e_1} & \overline{e_1e_1} & \ldots & \overline{e_ie_n} \\ \overline{e_2e_1} & \overline{e_2e_2} & \ldots & \overline{e_2e_n} \\ \cdot & \cdot & \cdots & \cdot \\ \cdot & \cdot & \cdots & \cdot \\ \cdot & \cdot & \cdots & \cdot \\ \overline{e_ne_1} & \overline{e_ne_2} & \cdot & \overline{e_ne_n} \end{matrix}\right\|$$

Because each element of this matrix is an averaged product, the matrix is a symmetric one. By convention, the first subscript of each element designates the row of the matrix in which it appears, and the second designates the column;

(*e*) determine all of the $n$ different eigenvalues $p_i$ of this matrix and number them in order of decreasing magnitudes; thus $$p_1 \geq p_2 \geq \ldots p_i \geq \ldots \geq p_n$$

(*f*) for each such eigenvalue $p_i$, determine all the components $h_{i1}, h_{i2} \ldots h_{ij} \ldots h_{in}$ of the normalized eigenvector corresponding to that eigenvalue;

(*g*) select $n^2$ magnitudes, typically designated $k_{ij}$, that are proportional, respectively, to the several normalized eigenvector components, typically designated $h_{ij}$, for like values of $i$ and $j$ and assign these magnitudes as transfer factors, one to each transfer element of the crossnet;

(*h*) dispose the several transfer elements in the crossnet so that the element whose transfer factor is $k_{ij}$ interconnects the $j$th input conductor of the crossnet with the $i$th output conductor.

Once the crossnet 12 of Fig. 1 has been designed, the crossnet 15 of Fig. 3 may be designed by following one simple rule: if a typical transfer element of the second crossnet be identified $l_{ij}$, wherein, as before, the first subscript designates the output conductor to which it is connected and the second subscript designates the input conductor, then every transfer element $l_{ij}$ should have the same magnitude as the element $k_{ji}$ of the transmitter crossnet 12, and vice versa; that is to say, the matrix of the magnitudes of the transfer factors of the crossnet 15 is the transpose of the matrix of the magnitudes of the transfer factors of the crossnet 12.

The recipe developed above operates to minimize the sum of the mean squared errors $$E=\overline{(e_1-e_1')^2}+\overline{(e_2-e_2')^2}+\ldots+\overline{(e_n-e_n')^2} \quad (35)$$

introduced by the omission of $n-m$ of the output signals $S_1, S_2 \ldots$, starting with the least important one. A more general recipe can be developed which operates to minimize the expectation of any positive definite quadratic function Q of the errors introduced in this fashion. For this purpose the general quadratic error function may be defined as follows:

$$\begin{aligned} Q=&b_{11}\overline{(e_1-e_1')^2}+b_{12}\overline{(e_1-e_1')(e_2-e_2')}+\ldots \\ &+b_{1n}\overline{(e_1-e_1')(e_n-e_n')}+b_{12}\overline{(e_2-e_2')(e_1-e_1')} \\ &+b_{22}\overline{(e_2'-e_2')^2}+\ldots+b_{1n}(e_n-e_n')(e_1-e_1') \\ &+\ldots+b_{nn}(e_n-e_n')^2 \end{aligned} \quad (36)$$

where each $b_{ij}$ is an arbitrary constant weighting factor.

Equation 36 is more general than Equation 35 and reduces to Equation 35 when every coefficient $b$ of Equation 36 having like subscripts is equal to unity and every $b$ having unlike subscripts is equal to 0; in other words when $$\begin{aligned} &b_{11}=b_{22}=\ldots=b_{nn}=1 \\ &b_{12}=b_{21}=\ldots b_{ij}=0\ (i\neq j) \end{aligned} \quad (37)$$

The recipe which operates to minimize the general quadratic error function Q of Equation 36 is as follows:

(A) Form the matrix $$B=\left\|\begin{matrix} b_{11} & b_{12} & b_{1n} \\ b_{12} & & \\ \cdots & & \\ b_{1n} & & b_{nn} \end{matrix}\right\| \quad (38)$$

(B) Using methods well known in matrix algebra as set forth, for example, in "Methods of Applied Mathematics" by F. B. Hildebrand (Prentice-Hall 1952) and equally well in the "Mathematics of Circuit Analysis" by E. A. Guillemin (Wiley 1949), express the matrix B in the form $$B=P_TP \quad (39)$$

where P is a nonsingular matrix of order $n$ and $P_T$ is its transpose.

(C) Construct an auxiliary crossnet 40 of conductors whose multiplier elements are proportional to the several numerical elements of the P matrix, and connect it ahead of and in tandem with the crossnet 12 of Fig. 1. Similarly, (D) construct another auxiliary crossnet 41 of which the multiplier elements are proportional to the several numerical elements of the matrix $P^{-1}$, namely, the inverse of the P matrix and connect it following and in tandem with the crossnet 15 of Fig. 3, all as shown in Fig. 6.

With this arrangement the signals $e_1, e_2 \ldots$ from the analyzer, which in Fig. 1 are applied to the input points of the crossnet 12 of Fig. 1, are now applied, instead, to the input points of the auxiliary crossnet 30 and its output signals $g_1, g_2 \ldots$, which are variously weighted combinations of the signals $e_1, e_2 \ldots$ are applied to the input points of the main crossnet 12 of Fig. 1. The latter operates to derive a set of output signals $S_1', S_2'$ and so forth arranged in order of importance as before but differing from the signals $S_1, S_2 \ldots$ by the action of the crossnet 40. These signals are transmitted over a transmission medium as before to the receiver station where they are first reconverted by the main crossnet 15 exactly as in the case of Fig. 2, into an intermediate set of output signals $g_1', g_2'$, which differ from the signals $g_1, g_2 \ldots$ only by the degradation introduced by omission of the least important S' channels. The signals of this intermediate set are in turn converted by the auxiliary crossnet 41 into a set of signals $e_1', e_2'$ for application to the synthesizing apparatus. It can be shown by well established methods of Matrix Algebra that the generalized error Q, which is given by Equation 36 as a function of the input signals $e_1, e_2 \ldots$, may be restated as a function of the intermediate signals $g_1, g_2 \ldots$ as $$Q=\overline{(g_1-g_1')^2}+\overline{(g_2-g_2')^2}+\ldots+\overline{(g_n-g_n')^2} \quad (40)$$

From this it follows that, if the recipe developed above for minimizing the mean squared error of the signals $e_1, e_2 \ldots$ is applied instead to the signals $g_1, g_2 \ldots$ the generalized quadratic error function Q will have been minimized.

In the graph of Fig. 2 each of the channel control signals is always of the same polarity. In other words, the graph has an average value other than zero, and, correspondingly, the signal represented by the graph has a steady component. Further economies in transmission may be effected by removing from each input signal of the crossnet 12 its own steady component and by restoring a corresponding steady component at the receiver. To this end a battery 30, 31 is shown connected in tandem with each member of each vertical conductor pair of the crossnet 12, and, too, batteries 35 are connected in series with the output conductors of the crossnet 15 of the receiver apparatus of Fig. 3. The magnitudes of the former batteries are to be selected to balance out the steady component of the corresponding signal, and the magnitudes of the latter batteries are to be selected to restore it.

This refinement is illustrated in Fig. 5 as a shift of the origin of coordinates from one end of the bean-shaped figure to its center O′, whose coordinates are $x_{10}$, $x_{20}$. This shift is along the axis $Y_1$. When it has been accomplished the second axis is no longer $Y_2$ but $Y_2'$.

Figure 7:
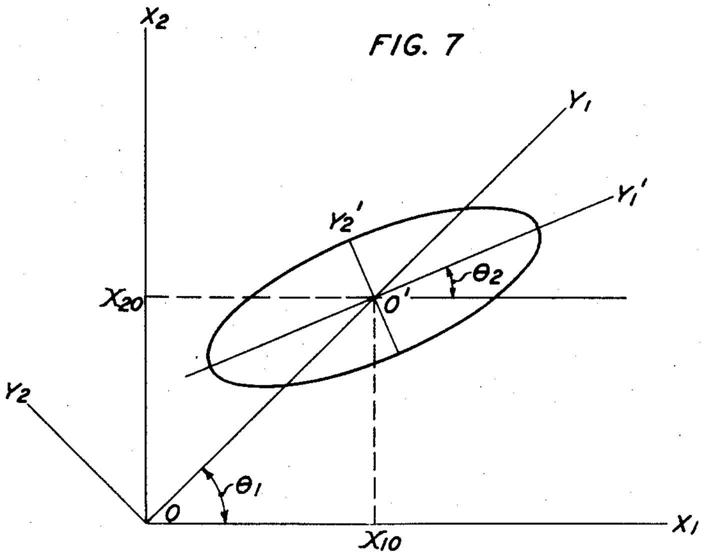

In the example depicted in Fig. 5, this shift of the origin has no effect on the angle $\theta$ of coordinate rotation. Under some circumstances, however, it may have such an effect. Fig. 7 illustrates such a situation. Here an ellipse is shown which lies entirely within the first quadrant of the axes $X_1$, $X_2$. A mere rotation of the coordinate axes in the fashion described above, namely through an angle $\theta_1$, would produce new axes $Y_1$ and $Y_2$ which do not lie in the directions of the eigenvectors of the ellipse. However, if the origin be first shifted to the point 0′ whose coordinates in the $X_1$, $X_2$ axes are $x_{10}$, $x_{20}$, then new axes $Y_1'$ and $Y_2'$ may readily be found which coincide with the major and minor axes of the elliptical figure; i.e., with its eigenvectors. These new axes, in addition to the translation of the origin, have been rotated through an angle $\theta_2$ which differs, in general, from the angle $\theta_1$. Accordingly, for optimum results the transfer elements of the crossnet 12 of Fig. 1 should be derived, following the recipe given above, from the products, not of the input signals themselves, but of the input signals as modified by the subtraction from each one of its own average value.

Now that the nature and effect of the signal conversion carried out by the crossnet of Fig. 1 have been explained and mathematically justified it should readily appear that this conversion from a first group of signals applied to the input conductors of the crossnet into a second group of signals derived from its output conductors is wholly independent of the nature of the input signals. In the example described in detail the input signals $e_1, e_2 \ldots e_n$ are ordered on the frequency scale. Still more specifically, they are derived by a spectrum analyzer from an original voice signal. These characteristics, however, are merely illustrative. The invention is equally applicable to effecting a conversion of any set of input signals ordered on any scale or disordered, and derived from any original source, or not so derived. For any such set of input signals the crossnet of the invention determines a set of output signals which are ordered on a scale of importance; and, in particular, they are so ordered on that scale that the mean squared error resulting from omission of the lower order output signals is minimized. In the event that it is desired to minimize, instead, some other quadratic error function of the signals $e_1, e_2 \ldots e_n$, it is necessary only to set up the required error function, and to derive, according to any desired rule, an intermediate set of signals $g_1, g_2 \ldots g_n$. This may be done either by giving the original signals unequal weights beforehand or by passing them first through an auxiliary crossnet as shown in Fig. 6. Upon the application of these intermediate signals to the crossnet of the invention the resulting output signals $S_1, S_2 \ldots S_n$ are so ordered in importance that the means squared error of the $g$ signals resulting from omission of the lower ordered S signals is minimized. This result is equivalent to the minimization of the required quadratic error function of the $e$ signals.

Any transformation which can be carried out by two crossnets connected in tandem and operating sequentially can equally well be carried out by a single crossnet of which the magnitudes of the several transfer elements are proportional to the several elements of a matrix that is equal to the product of the matrices from which the corresponding elements of the two original crossnets were derived. As a practical matter, therefore, crossnets 12 and 40 of Fig. 6 will normally be coalesced in this fashion. The same holds for crossnets 15 and 41.

What is claimed is:

1. Signal conversion apparatus which comprises, in combination with a group of distinct, intercorrelated signals $e_1, e_2 \ldots e_j \ldots e_n$, a crossnet comprising a group of input conductors $C_1, C_2 \ldots C_j \ldots C_n$, a group of output conductors $D_1, D_2 \ldots D_i \ldots D_m$ $(m \leqq n)$ and a plurality of transfer elements, $n$, $m$ in number, each interconnecting one and only one input conductor with one and only one output conductor, the transfer factor $k_{ij}$ of the element interconnecting the $j$th input conductor $C_j$ with the $i$th output conductor $D_i$ $$(j=1, 2 \ldots n;\ i=1, 2 \ldots m)$$

being equal to a solution $h_{ij}$ of the equation $$p_i h_{ij} = \sum_{r=1}^{n} \overline{e_j e_r} . h_{ir}$$

wherein each $p_i$ is one of $n$ numbers, not necessarily different in magnitude, for which these equations have $n^2$ nonvanishing solutions, said solutions, $n^2$ in number, being normalized according to the conditions $$\sum_{j=1}^{n} (h_{ij})^2 = 1$$

said numbers $p_i$ being arranged in order of decreasing magnitude $(p_i \geqq p_2 \geqq \ldots p_i \geqq \ldots p_n)$, sources of a plurality of signals that are similar in character and distribution to the signals $e_1, e_2 \ldots e_j \ldots e_n$, connections for applying the signals of said sources, respectively, to the similarly designated ones of said input conductors, and connections for withdrawing derived signals $S_1$, $S_2$, etc. from similarly identified ones of said output conductors, whereby the output signals derived from the output conductors $D_1$, $D_2$, etc. are arranged in order of decreasing energy content.

2. In combination with apparatus as defined in claim 1, means for transmitting to a receiver station those of said derived signals $S_1$, $S_2$, etc. having higher energy contents, those having lower energy contents being discarded and, at said receiver station, a second crossnet of input conductors and output conductors, a plurality of transfer elements, each interconnecting one and only one input conductor with one and only one output conductor, the transfer factor $e_{ij}$ of the element interconnecting the $i$th output conductor of said second net with the $j$th input conductor of said second net being equal to the transfer factor $k_{ji}$ of a transfer element of the first crossnet, means for applying each of the several transmitted signals $S_1$, to the similarly identified input conductor of the second crossnet, connections for withdrawing output signals $e'_1, e'_2 \ldots e'_n$ from the similarly identified output conductors of the second crossnet, and means for utilizing said last-named signals.

3. Signal conversion apparatus which comprises, in combination with a group of distinct, intercorrelated signals $e_1, e_1 \ldots e_j \ldots e_n$, apparatus for deriving from said signals a related group of signals, in number equal to or less than $n$ and designated $S_1, S_2 \ldots S_i \ldots$ etc. each of which is a composite of all the input signals, said apparatus including a set of input conductors, a set of output conductors, and a plurality of transfer elements equal in number to the product of the number of input conductors by the number of output conductors, each such element interconnecting one and only one input conductor with one and only one output conductor, and connections for applying each input signal $e_j$ to the similarly identified one of the input conductors, the transfer factor $k_{ij}$ of the element interconnecting the $i$th output conductor with the $j$th input conductor being equal in magnitude to a number $h_{ij}$, which number is the $j$th component of the eigenvector corresponding to the $i$th eigenvalue $p_i$ of a square symmetric matrix M of which the element located in the $i$th row and the $j$th column is the time averaged product $\overline{e_i e_j}$, etc. of each input signal by itself and by every other input signal, where the several eigenvalues $p_i$ are arranged in decreasing order of magnitude, namely $p_1 \geq p_2 \geq p_3 \geq p_i \geq p_n$, whereby the several output signals $S_1$, $S_2$, etc. appearing on the similarly identified ones of the output conductors are arranged in order of decreasing energy content.

4. In combination with apparatus as defined in claim 3, means for transmitting to a receiver station those of said derived signals $S_1$, $S_2$, etc. having higher energy contents, those having lower energy contents being discarded and, at said receiver station, a second crossnet of input conductors and output conductors, a plurality of transfer elements, each interconnecting one and only one input conductor with one and only one output conductor, the transfer factor $e_{ij}$ of the element interconnecting the $i$th output conductor of said second net with the $j$th input conductor of said second net being equal to the transfer factor $k_{ji}$ of a transfer element of the first crossnet, means for applying each of the several transmitted signals $S_1$, $S_2$, etc. to the similarly identified input conductor of the second crossnet, connections for withdrawing output signals $e'_1, e'_2 \ldots e'_n$ from the similarly identified output conductors of the second crossnet, and means for utilizing said last-named signals.

5. In combination with a source of a speech wave, a plurality of filters for deriving from said speech wave a group of signals, $n$ in number and designated $e_1, e_2 \ldots e_j \ldots e_n$, each representative of that portion of the energy of said speech wave that falls within a preassigned one of a plurality of adjacent frequency bands that together span the frequency range of said speech wave, apparatus for deriving from said signals a related group of signals, in number equal to or less than $n$ and designated $S_1, S_2 \ldots S_i \ldots$ etc. each of which is a composite of all the input signals, said apparatus including a set of input conductors, a set of output conductors, and a plurality of transfer elements equal in number to the product of the number of input conductors by the number of output conductors, each such element interconnecting one and only one input conductor with one and only one output conductor, and connections for applying each input signal $e_j$ to the similarly identified one of the input conductors, the transfer factor $k_{ij}$ of the element interconnecting the $i$th output conductor with the $j$th input conductor being equal in magnitude to a number $h_{ij}$, which number is the $j$th component of the eigenvector corresponding to the $i$th eigenvalue $p_i$ of a square symmetric matrix M of which the element located in the $i$th row and the $j$th column is the time averaged product $\overline{e_i e_j}$, etc. of each input signal by itself and by every other input signal, where the several eigenvalues $p_i$ are arranged in decreasing order of magnitude, namely $p_1 \geq p_2 \geq p_3 \ldots \geq p_i \ldots \geq p_n$, whereby the several output signals $S_1$, $S_2$, etc. appearing on the similarly identified ones of the output conductors are arranged in order of decreasing energy content.

6. In combination with apparatus as defined in claim 5, means for transmitting to a receiver station those of said derived signals $S_1$, $S_2$, etc. having higher energy contents, those having lower energy contents being discarded and, at said receiver station, a second crossnet of input conductors and output conductors, a plurality of transfer elements, each interconnecting one and only one input conductor with one and only one output conductor, the transfer factor $l_{ij}$ of the element interconnecting the $i$th output conductor of said second net with the $j$th input conductor of said second net being equal to the transfer factor $k_{ji}$ of a transfer element of the first crossnet, means for applying each of the several transmitted signals $S_1$, $S_2$, etc. to the similarly identified input conductor of the second crossnet, connections for withdrawing output signals $e'_1, e'_2 \ldots e'_n$ from the similarly identified output conductors of the second crossnet, and means controlled by said last-named signals for synthesizing an artificial speech wave.

References Cited in the file of this patent

UNITED STATES PATENTS

| | | |
|---|---|---|
| 2,151,091 | Dudley | Mar. 21, 1939 |
| 2,517,102 | Flory | Aug. 1, 1950 |

OTHER REFERENCES

The Review of Scientific Instruments, vol 18, No. 11; Nov. 1947, pgs. 831–836.

Transactions, American Geophysical Union, vol. 28, No. 6, Dec. 1947, pp. 831, 837.

The Mathematics of Physics and Chemistry, by Margenau and Murphy, Van Nostrand, 1948.

British Journal of Applied Physics, vol. 1, 1950, pgs. 92–103.

British Journal of Applied Physics, vol. 5, No. 1, Jan. 1954, pgs. 32–35.

Analog Methods in Computation and Simulation by Soroka, McGraw-Hill, 1954.